M. S. GILL.
PISTON RING.
APPLICATION FILED MAY 29, 1919.
1,354,547.
Patented Oct. 5, 1920.
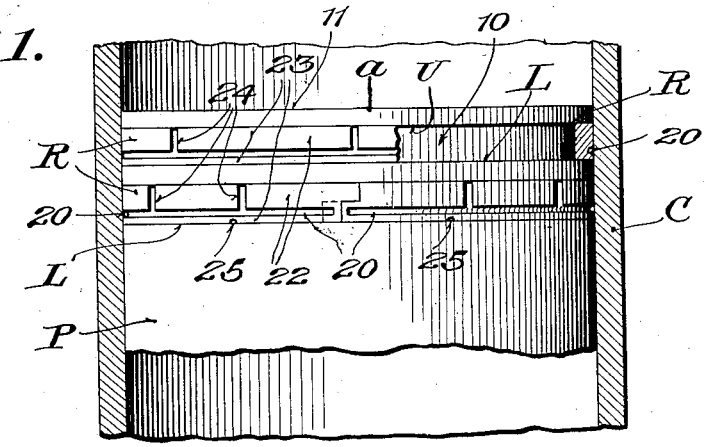
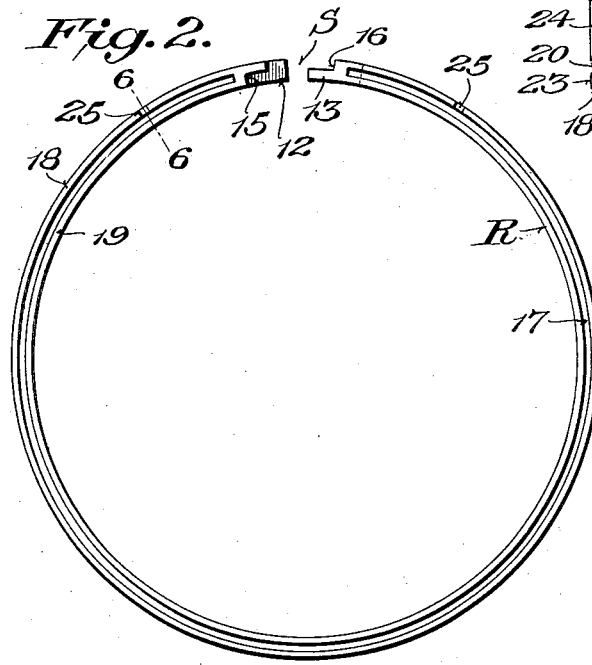
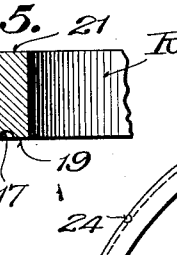
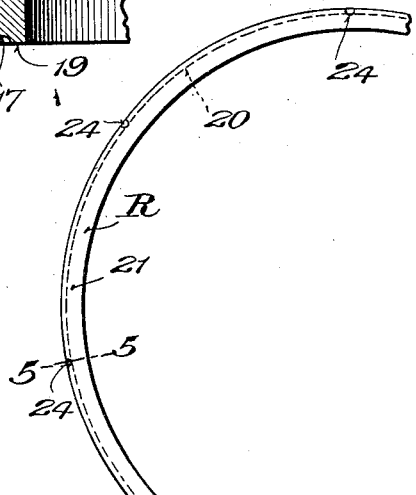
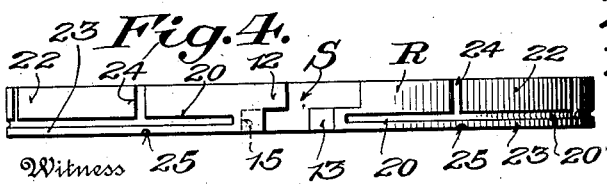
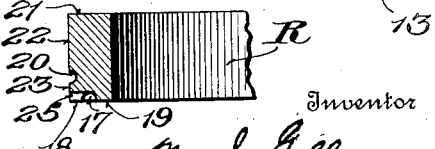
Witness
Chas. L. Griesbauer
Inventor
M. S. Gill,
By E. L. Greenewald
his Attorney

UNITED STATES PATENT OFFICE.

MIDDLETON S. GILL, OF SAN FRANCISCO, CALIFORNIA.

PISTON-RING.

1,354,547.  Specification of Letters Patent.  Patented Oct. 5, 1920.

Application filed May 29, 1919. Serial No. 300,615.

*To all whom it may concern:*

Be it known that I, MIDDLETON S. GILL, a citizen of the United States, residing at San Francisco, in the county of San Francisco and State of California, have invented certain new and useful Improvements in Piston-Rings; and do hereby declare the following to be a full, clear, and exact description of the invention, such as will enable others skilled in the art to which it appertains to make and use the same.

My invention relates to piston rings adapted for use as packing means between pistons and cylinders of gas, steam or other engines, and relates more particularly to a one-piece metal piston ring especially suitable for use on pistons of internal combustion engines.

During the working stroke of such pistons, the usual piston ring has a tendency to be drawn away from the lower side of the ring groove in the piston, thereby breaking the seal between the piston ring and the piston. The object of my invention is, therefore, to provide a piston ring of such construction that it will be held against the lower side of the ring groove during the working stroke of the piston and thereby maintain an efficient seal between the piston ring and piston.

Another object of the invention is to provide a piston ring that will prevent leakage past the piston ring and yet exert a minimum of friction against the cylinder wall, the piston ring being so constructed that the differential pressure will hold it in sealing position.

The above and other objects and the novel features of my invention will be apparent from the following description and the accompanying drawing, which forms a part of this application, and in which—

Figure 1 is a view partly in section and partly in elevation illustrating a portion of a cylinder and a portion of a piston therein equipped with piston rings embodying my invention.

Fig. 2 is a view of one edge and Fig. 3 is a partial view of the other edge of a piston ring embodying my invention;

Fig. 4 is a view of a portion of the periphery of the piston ring, and Figs. 5 and 6 are sectional views of the piston ring taken along the lines 5—5 and 6—6 of Figs. 2 and 3, respectively.

Referring to the drawing, C represents a portion of an engine or motor cylinder, such as the cylinder of a gas or internal combustion engine, and P represents a portion of the piston working in said cylinder. The piston employed may be of any suitable type having one or more ring grooves 10 in its surface that engages the inside wall of the cylinder. A trunk piston having two ring grooves is here illustrated, and the same may be connected in any well known or preferred manner to the crank shaft of the engine. For convenience, it will be assumed that the cylinder C is a vertical one and that the motive force of the explosive or compressed gases is exerted in the direction of the arrow $a$ upon the top or upper side 11 of the piston P, causing the latter to be moved in the same direction or downwardly, as in the usual automobile engine.

Each of the ring grooves 10 has parallel upper and lower side walls, U and L, respectively, disposed in planes perpendicular to the axis of the piston, and a circular bottom wall, the groove opening outwardly or facing the inside wall of the cylinder, as is usual.

A piston ring R fits snugly into each groove, the ring groove 10 being slightly wider than the ring that it is designed to receive so the ring may have some freedom of movement. Each piston ring R is made of a single piece of suitable resilient metal, the ring being split or divided transversely as at S, providing ends or tongues 12 and 13 which have portions 15 and 16 that overlap or interfit to form, in effect, a continuous ring when the same is sprung into place in the groove in the piston. Other forms of overlapping or abutting ends may, of course, be adopted without departing from the spirit of my invention. When the ring is in place in the groove and in the cylinder, its inherent resiliency tends to expand it slightly and hold it in close gas-sealing contact with the inner surface of the cylinder wall. The overlapping parts at the split S permit such expansion of the ring and at the same time maintain the seal at the joint. The ring embodying my invention is provided with a groove 17 in its lower edge which faces the flat or plain surface of the lower wall L of the ring groove. The groove 17 is substantially coextensive with the lower edge of the ring, but does not cross the joint or split S, the ends of said groove 17 terminating adjacent to the overlapping ends 12 and 13 of the ring. The groove 17 is bounded on opposite sides thereof by co-planer faces 18 and 19 which bear against the lower side wall L of the groove 10 in the piston, the surface 19 being maintained in abutting relation to said wall of the ring groove in the piston and therefore constitutes a sealing surface.

A peripheral groove 20 is disposed in the exterior or peripheral face of the piston ring R, the groove 20 terminating near the ends of the ring but not extending across the split or joint therebetween. The groove 20 is nearer to the lower edge of the ring containing the groove 17 than to the upper edge 21 and is bounded on opposite sides by the surfaces 22 and 23 which engage the interior wall of the cylinder C.

Short channels 24 extend from the groove 20 across the surface 22 on the periphery of the ring and terminate at or open into the upper edge face 21, thereby establishing communication between the outer peripheral groove 20 and the space adjacent the upper edge of the ring. Similarly, short channels or ports 25 which are disposed on opposite sides of the split 5, extend from the groove 17 outwardly across the edge surface 18 and open into or terminate at the peripheral surface 23, thereby establishing communication between the groove 17 and the outer periphery of the ring. The friction between the piston ring and cylinder wall and the pressure of the compressed gases during the compression stroke or up-stroke, in Fig. 1, force the ring R against the lower wall L of the groove 10. However, the usual piston ring, because of its frictional engagement with the cylinder wall, has a tendency to lag behind the piston during the working stroke of the latter and will move away from the lower wall of the ring groove in the piston, thereby breaking the gas and oil seal between the piston ring and the piston.

Piston rings embodying my invention prevent leakage past the joint between the ring and the piston as well as past the joint between the ring and the cylinder wall. Piston rings now in use generally prevent leakage of gas and oil past the ring during the compression stroke of the engine but are not efficient in preventing leakage of oil and gas past the joint between the ring and piston during the power or working stroke, because the proper seal is not at all times maintained between the ring and piston.

It appears that the operation of my improved ring depends upon the fact that the pressure holding the portion of the ring in frictional engagement with the cylinder wall (due to the combined gas pressure and resiliency of the ring) while sufficient to prevent leakage past the ring and the cylinder wall, is not sufficient to cause the ring to break its seal with the piston. Accordingly, the gas pressure holds the ring against the lower wall of the ring groove in the piston, during both compression and working strokes and thus prevents leakage in either direction past the joint between the ring and piston.

In using the invention in a counterflow engine with a condenser, suction would have the same effect on the ring, that pressure has in a gas engine as just described.

The surfaces 19 and 23 are the only surfaces of the ring which pressure or suction can act upon and are the surfaces that make the seal. For convenience, I term them "live" surfaces.

An improved piston ring embodying the present invention is also disclosed in my application Serial No. 350,356 filed January 9, 1920, and accordingly while I have herein shown and described my invention in detail, it is to be understood that various changes may be made therein without departing from the spirit of the invention and therefore I do not wish to be limited to the exact details herein disclosed.

What I claim is:

1. A piston ring split transversely to provide opposed separable ends, said ring having a groove extending longitudinally of one of its edge faces and terminating adjacent to said ends, and also having a sealing surface between said groove and the inner side of said ring, and one or more channels extending from said groove to the outer side or periphery of said ring.

2. A piston ring split transversely to provide opposed separable ends, said ring having a groove extending longitudinally of an edge face thereof and terminating adjacent to said ends, and also having channels on opposite sides of said split and extending from said groove to the outer periphery of said ring.

3. A piston ring split transversely to provide opposed separable ends, said ring having a groove extending longitudinally of one of its edge faces and terminating adjacent to said ends, and also having a sealing surface between said groove and the inner side of said ring, and channels or pressure relief ports in such edge face on opposite sides of said split and extending from said groove to the outer periphery of said ring.

4. A piston ring having a groove in its outer peripheral face nearer one edge face of the ring than the other and communicating with the space adjacent the remote edge face of the ring, and a groove disposed in and extending longitudinally of the edge face of the ring nearer such outer peripheral groove.

5. A piston ring having a groove in its outer peripheral face nearer one edge of the ring than the other, and channel means in said peripheral face between said groove and the more remote edge, and a groove in the edge face nearer such peripheral groove.

6. A piston ring having a groove in its outer peripheral face in communication with the space adjacent one edge face of the ring, a groove in the other edge face of the ring, and a channel in said other edge face extending from such last-mentioned groove to the outer peripheral face of the ring.

7. A piston ring having opposed ends and a groove in one of its edge faces terminating short of said ends and communicating with the space adjacent the outer periphery of the ring, and another groove in its peripheral face communicating with the space adjacent the other edge face of the ring.

8. A piston ring having a transverse split at one point, a groove extending nearly the length of one of the edge faces of the ring but terminating at a distance from said split, and means establishing communication between said groove and the outer periphery of said ring.

9. A piston ring having a channel or groove in an edge face thereof that is adapted to abut against a wall of a ring-receiving groove of a piston, and a fluid passage or passages in said edge face and between said channel and the outer periphery of the ring.

10. A piston ring of resilient material having a transverse split at one point, a groove in one of its edge faces terminating adjacent to but short of said split, and a passage in said edge face leading from said groove to the outer periphery of said ring.

11. In combination, a piston having a ring-receiving groove provided with an imperforate side wall, and a piston ring having a groove in one of its edge faces opposed to and coöperating with said imperforate side wall of said ring-receiving groove, and a channel extending from said groove in the ring to the outer periphery of said ring.

12. A one-piece resilient piston ring split transversely providing opposed separable ends, said ring having a groove in one of its edge faces terminating adjacent to but not crossing said split, channels on opposite sides of said split and extending from said groove to the outer periphery of the ring, and another groove in the outer peripheral face of the ring, said ring having a passage leading from such outer peripheral groove to the other edge face of said ring.

In testimony whereof I hereunto affix my signature.

MIDDLETON S. GILL.